United States Patent [19]  [11] 3,874,427
Tiggelbeck  [45] Apr. 1, 1975

[54] FUEL VAPOR RECOVERY SYSTEM
[75] Inventor: Donald David Tiggelbeck, Pittsburgh, Pa.
[73] Assignee: Calgon Corporation, Pittsburgh, Pa.
[22] Filed: Mar. 20, 1974
[21] Appl. No.: 452,891

[52] U.S. Cl. .................. 141/52, 55/387, 141/290
[51] Int. Cl. ............................................ B65b 31/00
[58] Field of Search .... 55/88, 387; 141/4, 5, 44–46, 141/52, 59, 65, 93, 98, 290; 220/85 VR, 85 VS

[56] References Cited
UNITED STATES PATENTS
3,815,327  6/1974  Viland ............................ 141/290 X Primary Examiner—Richard E. Aegerter
Assistant Examiner—Frederick R. Schmidt
Attorney, Agent, or Firm—Harry E. Westlake, Jr.; Frank M. Mahon; Raymond M. Speer

[57] ABSTRACT

A fuel vapor recovery system is provided for recovering vapors displaced from automotive vehicle fuel tanks during the filling thereof from a bulk storage tank. Displaced vapors are attracted by vacuum in a dual system alternatively to a hydrocarbon vapor adsorbing means and to the bulk fuel storage tank.

8 Claims, 1 Drawing Figure

PATENTED APR 1 1975　　　　　　　　　　　　　　　　　　3,874,427
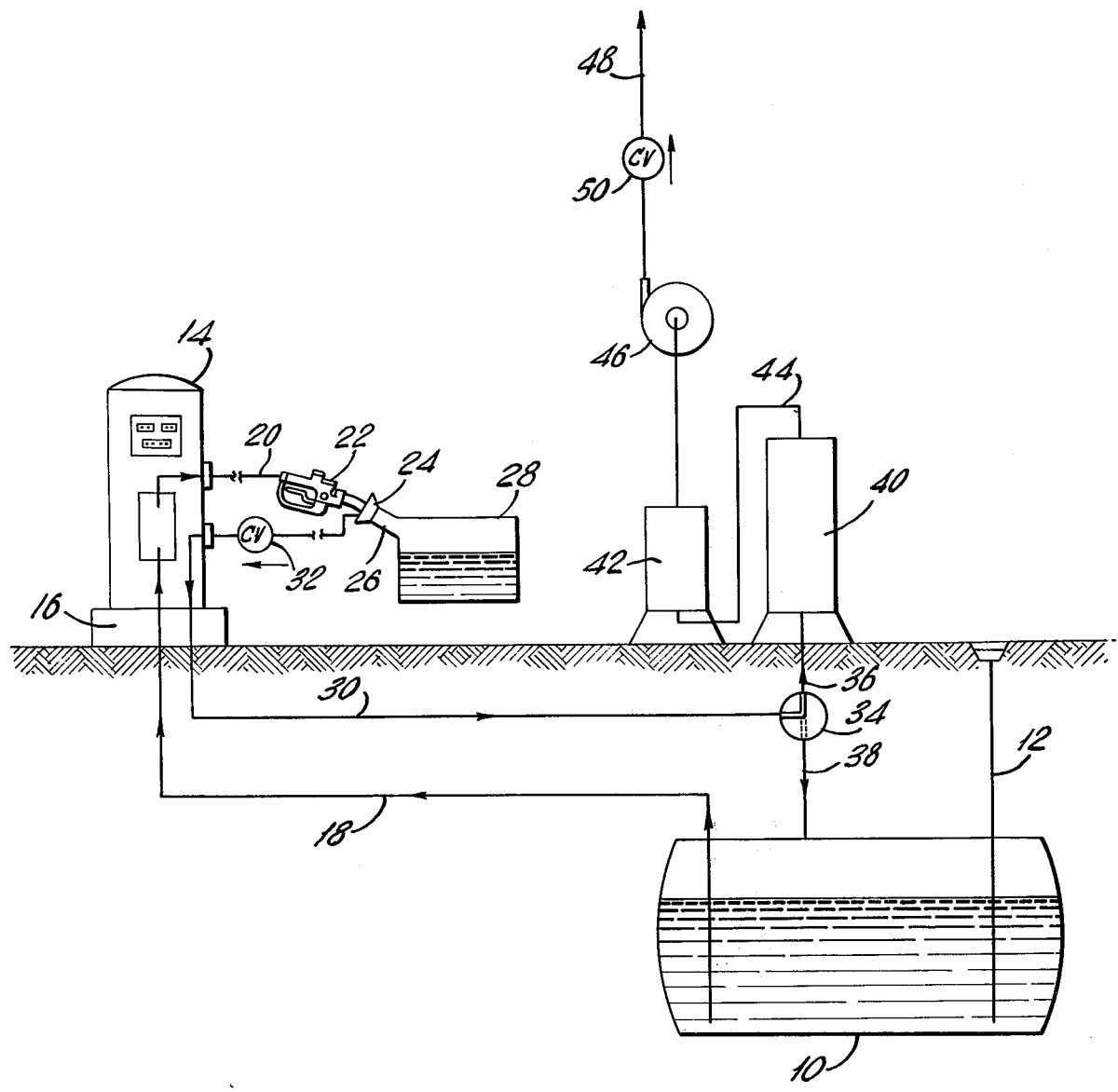

FUEL VAPOR RECOVERY SYSTEM

This invention relates in general to new and useful vapor recovery systems designed to recover vapors normally discharged to the atmosphere during the transfer of volatile liquids from a bulk storage tank to a container or tank to be filled. More particularly, the instant invention relates to a novel hydrocarbon recovery system designed for the recovery of hydrocarbon vapors displaced from an automotive vehicle fuel tank, or the like, during the filling thereof from a bulk fuel storage tank.

Generally, when fuel is pumped from a bulk storage tank into the fuel tank of an automotive vehicle or the like, the hydrocarbon vapors displaced from the automotive vehicle fuel tank during the filling process are exhausted through the fuel tank vent and the fuel tank filling spout directly to the atmosphere without any attempt being made to collect and recover the vapors. Since such vapor loss occurs each time an automotive vehicle tank is filled, and during the transfer of fuels at refineries, bulk storage plants, and during deliveries at service stations, it will be appreciated that significant quantities of hydrocarbon vapor pollutants are discharged to the atmosphere in this manner. It is estimated that almost 1% of the nation's gasoline supplies is lost in the transfer system. The problem of evaporative loss of volatile fuel for automotive vehicles is one of growing concern to the automotive and petroleum industries. Further, the smog and pollution problem created by such discharge of vapors, especially in areas of high population density, is as serious a problem as the economic loss of valuable fuel.

Although the problem long has been recognized and many attempts have been made to design recovery systems to collect and recover hydrocarbon vapors discharge during the filling process, no wholly satisfactory and reliable method has been available for such purpose. Prior systems proposed for gasoline vapor recovery have employed what might be described as a, "positive pressure vapor return," wherein fuel vapors displaced from the automotive vehicle fuel tank during filling are captured through a vapor-tight seal between the filling nozzle and the fuel tank and returned either directly to the service station underground storage tank, or to one or more collection and condensing means, or to both (see, for example, Davis, U.S. Pat. No. 3,543,484, Dec. 1, 1970, and Gosselin, U.S. Pat. No. 2,908,299, Oct. 13, 1959). In general, however, forced displacement of fuel vapors through generating internal tank pressure has major drawbacks, including (1) vapor losses occur through tank vents on many present vehicles and (2) it is difficult, if not impossible to develop a satisfactory nozzle which will retrofit all autmotive vehicle fuel tanks and provide the seal required in such systems (at least without the necessity of modifying the automotive vehicle fuel tank). To the extent that 100% vapor collection is not achieved, either through fuel tank vent loss or through imperfect seal, air pollution occurs and legislative control standards, both present and proposed, cannot be met.

These difficulties have led to fuel vapor recovery system designs wherein some method of assisting vapors to follow the control piping is employed, thus potentially collecting all vapors unless an ill-designed or very poorly fitting nozzle was used. Such system, for example, is disclosed in Onufer, U.S. Pat. No. 3,581,782, June 1, 1971, wherein a vacuum pump is placed in a vapor return line between the automotive vehicle fuel tank and an adsorptive material which prevents vapors from reaching the atmosphere; the vacuum pump to be run at a rate substantially equal to the rate at which fuel is being dispensed, and while fuel is being dispensed, so that vapors are attracted to the pump and pressured through the adsorptive material. Arrangements of this and similar basic design have achieved some prominence in systems being developed for this application.

The vapor recovery system of the instant invention offers an improved design leading to significant benefits not heretofore achieved in the vapor recovery systems disclosed in the prior art. The benefits of the instant invention are achieved by placing a vapor impeller (e.g., a blower or vacuum pump) in the system at a point after the adsorbent canister; i.e., downstream of the adsorbent canister. In addition to the vapor impeller, the vapor recovery system of the instant invention utilizes a plenum to increase the volume of the vapor return piping at a point, or points, external to the underground bulk storage tank, a timer and/or a solenoid, magnetic, flow, pressure, mechanical or other activated valving for functions hereinafter described. Hoses, valves, piping and nozzles at the pump island may be as previously known or may be of any design accomplishing similar function.

The vapor recovery system of the instant invention, unlike systems heretofore proposed, is designed to pull vapors through the adsorbent and/or to the underground bulk storage tank. It is designed also to be in the active mode (1) before fuel is pumped; (2) not each time gasoline is pumped; and (3) not related to the amount or rate of pumping per fill. Most importantly the vapor recovery system of this invention minimizes the hydrocarbon load on the adsorbent canister which permits more effective and efficient operation.

Other advantages and meritorious features will more fully appear from the following description, claims and accompanying drawing wherein:

The FIGURE is a schematic view of the vapor recovery system of this invention utilized in a gasoline filling station.

Referring particularly to the FIGURE of the drawing, the vapor recovery system of the instant invention is shown in conjunction with a conventional automotive vehicle fuel tank filling system of the type conventionally employed in retail gasoline service stations. This system includes a conventional fuel pump 14 mounted on a pump island 16 above underground storage tank 10. The storage tank 10 is equipped with filling means 12 which is sealed to the atmosphere when not in use. The upper end of fuel delivery line 18, which communicates with underground storage tank 10 near the bottom thereof, is connected to the intake of fuel pump 14 (or a submersible pump in storage tank 10, now shown). The discharge of pump 14 is connected to one end of flexible fuel delivery hose 20. The opposite end of hose 20 is attached to a suitable vapor recovery-type fuel delivery nozzle 22 having a sealing means 24 which is adapted to form a substantially vapor-tight seal, or vapor-restricting configuration, with filling spout 26 of automotive vehicle fuel tank 28.

Vapor return line 30 is connected at one end with fuel delivery nozzle 22, passes through valve 32 (valve 32 may also be in nozzle, etc.), and at the other end is connected through three-way valve 34 where it is divided into first branch 36 and second branch 38. At its lower end, vapor return branch line 38 communicates with the upper portion of underground storage tank 10. Vapor return branch line 36, at its upper end is connected to the bottom of plenum (surge tank) 40. Plenum 40 is connected to the bottom of adsorbent canister 42 through conduit 44. Alternatively, the plenum may be formed as part of the head-space of canister 42 or may be located down-stream of said canister.

Vapor impeller 46, (e.g., blower or vacuum pump) is connected to the discharge side of adsorbent canister 42. The discharge of vapor impeller 46 is led through vent pipe 48 in which there is placed one-way valve 50 which permits the discharge of vapor impeller 46 to pass to the atmosphere but will not allow vapor flow in the opposite direction.

In the operation of the vapor recovery system of this invention, at start-up, three-way valve 34 is positioned so as to allow free communication between vapor impeller 46, carbon canister 42, plenum 40 and vapor return lines 30 and 36. Removing nozzle 22 from its usual storage position on pump 14 signals the gasoline pump to turn on, as is conventionally done, and also signals vapor impeller 46 to operate for a brief period on a cycle timed to the impeller's rated capacity. This procudes a mild vacuum condition in the return piping and in the plenum and carbon canister, which is held by valves 32, 34 and 50, but does not require withdrawing vapor from underground tank 10 because three-way valve 34 is isolating the underground tank in this mode.

The degree of vacuum which is required to be produced in the vapor return system external to the underground tank in order to effect vapor collection must be at least sufficient to overcome the pressure drop caused by the resistance in the nozzle, vapor return piping, plenum and canister. While this pressure drop can vary substantially depending upon such factors as gasoline delivery rate, vapor/liquid displacement ratio, vapor flow through the nozzle, plenum size and canister size, the pressure drop normally will not exceed 0.5 to 3.5 inches of water in most commercial installation and will usually be less than about 2.5 inches of water. The maximum vacuum in the vapor recovery system must be no higher than that which safely can be tolerated without danger of collapsing the automotive vehicle fuel under unusual upset or accidental conditions. A maximum vacuum of 20 inches of water usually can be employed although lesser vacuums, e.g., 10 to 15 inches of water, also are satisfactory.

In a typical system, therefore, when the gasoline pump and the vapor impeller are activated, as by removal of the fuel delivery nozzle from its normal storage position on the gasoline pump housing, the vapor impeller will pull a vacuum of 20 inches of water on the canister/plenum/vapor return piping system. The vapor impeller will then shut off responsive to conventional time delay or vacuum sensing means not shown, and will not start again until the plenum vacuum reaches the minimum level required, 2.5 inches of water for example.

When fuel delivery nozzle 22 is brought into sealing engagement with fill spout 26 of automotive vehicle fuel tank 28 and its valve is opened in the usual manner to begin transfer of fuel from underground tank 10 to the vehicle fuel tank 28, valve 32 in vapor return line 30 is switched to the open position thus connecting the automotive vehicle fuel tank to vapor return lines 30 and 36, and through plenum 40 and canister 42. The opening and closing of valve 32 may be controlled by any conventional means such as solenoid control means or fuel delivery sensing means, not shown. The vacuum which has been established in the vapor return system external to the underground tank is now available for attracting filling vapors from the vehicle fuel tank toward the adsorbent canister 42 where some of the vapors are removed, but where most reside in the piping and plenum. In this mode of operation, only part of thhe vapors displaced from the vehicle fuel tank during the filling operation are attracted to the adsorbent canister. When the filling operation is completed and the valve of fuel delivery nozzle 22 is closed, valve 32 is switched to the closed position thus re-establishing the vacuum holding condition in the vapor return system external to the underground tank.

It will be appreciated that during the mode of operation described above wherein the underground tank 10 is isolated from the vapor return system, a vacuum condition is being created in the underground tank due to fuel removal. When a suitable vacuum is established in the underground tank, three-way valve 34, responsive to conventional vacuum sensing means, not shown, will switch so as to connect the underground tank with nozzle 22 and vapor return lines 30 and 38, and preferably, simultaneously isolate the impeller/canister/plenum system from the vapor return line 30. The degree of vacuum which must be established in the underground tank before the switch-over occurs is arbitrary and can vary significantly. Usually, however, it will be satisfactory to set the switch-over point at an underground tank vacuum of about 2 to 20 inches of water. This vacuum then will serve to attract the gasoline refueling vapors to the underground tank during subsequent fills. In this mode of operation, all of the vapors being displaced from the vehicle fuel tank during the filling operation are being returned to the underground tank, thus eliminating the vapor adsorption load on the adsorption canister. Under certain atmosphheric, fuel tank(s) temperature, and pumping conditions, the vapor to liquid ratio can approximate 1:1. allowing extensive operation not involving the adsorbent. The vapor recovery system will remain in this mode of operation until the vacuum in the underground tank is reduced to the minimum required to overcome the resistance in the vapor return line/nozzle system. Usually this minimum vacuum will not vary significantly from the minimum vacuum required in the plenum/canister system as described above, i.e., 1.5 to 3.5 inches of water. When the vacuum in the underground tank is reduced to this level, three-way valve 34 is switched back to plenum blower control.

As will be seen from the foregoing description, the vapor recovery system of this invention permits maximum recovery of vapors displaced during normal refueling of automotive vehicle fuel tanks, and the like, while minimizing the vapor adsorbing load on the adsorbent canister. Such system reduces the quantity of adsorbent required for effective vapor emission control and reduces the frequency at which the adsorbent must be replaced or otherwise regenerated. The system also accomplishes benefits additional to minimizing the use of adsorbent. For example, if there are minor leaks in the system, they are compensated while the control system continues to prevent vapor emission. Further, gross leaks do not lead to atmospheric contamination, as could occur in a partially pressurized system, and excess air would be limited, during fills and at idle periods, to that necessary to equalize the very mild system vacuum. The latter is a potentially important way to decrease the possibility of creating an explosive mixture in the system, especially in the underground tank head space.

As the adsorptive material in adsorbent canister 42, there may be employed any material capable of adsorbing hydrocarbon vapors such as, for example, silica gel, molecular sieves derived from natural and synthetic zeolites, charcoal and activated carbon. Activated carbons are the preferred adsorptive materials. Typical activated carbon adsorbents which may be employed include, for example, Pittsburgh Activated Carbon-type BPX Activated Carbon (8 × 30 United States Sieve Series) and Pittsburgh Actiated Carbon-type BPL (12 × 30 United States Sieve Series).

When, through use, the adsorptive material in adsorbent canister 42 becomes saturated and no longer effective in adsorbing hydrocarbon vapors, it is essentially replaced with an identical canister containing fresh or regenerated adsorptive material. Conveniently, canisters containing spent adsorbent material may be collected from many gasoline filling stations and transported to a central site where facilities for regeneration or repacking are maintained. Desirably, the spent adsorbent canisters are regenerated at such site by stripping the adsorbed hydrocarbons from the adsorptive material by conventional means such as conventional steam regeneration techniques after which the stripped hydrocarbons can be condensed and recovered. The regenerated adsorbent canisters then can be returned to the filling station sites for further use. Of course, a portable regeneration means might also be used with fixed canister or canisters, or both canister and regeneration means may be part of each installation. Other system modifications, such as the use of a submerged sparger in storage tank 10 for communication of vapor return branch 38 and consequent scrubbing of vapors by liquid gasoline, are contemplated in the instant invention and are considered to be the full equivalent of the specific system described above.

The subject matter which applicant regards as his invention is particularly pointed out and distinctly claimed as follows:

1. A fuel vapor recovery system comprising in combination:
   a bulk fuel storage tank;
   a fuel delivery conduit communicating at one end with liquid fuel in said bulk fuel storage tank and communicating at the other end with one end of a flexible fuel delivery hose;
   a fuel delivery nozzle affixed to the opposite end of said fuel delivery hose, said fuel delivery nozzle having sealing means adapted to form a substantially vapor-tight or vapor-limiting connection between said fuel delivery nozzle and a filling spout of an automotive fuel tank;
   a vapor return conduit communicating at one end through said sealing means with said automotive vehicle fuel tank;
   a normally closed valve means mounted in or controlling said one end of said vapor return conduit, said valve means being adapted to switch to the open position only when fuel is being delivered through said fuel delivery nozzle to said automotive vehicle fuel tank;
   a three-way valve means mounted on the opposite end of said vapor return conduit adapted to divide said vapor return conduit alternatively into first and second branches;
   a conduit including plenum means constituting said first vapor return branch communicating at one end with said three-way valve means and at the other end with means for adsorbing fuel vapors, said means for adsorbing fuel vapors comprising a canister of adsorptive material and having a discharge side;
   a vent conduit communicating at one end with the atmosphere and at the other end with the discharge side of said means for adsorbing fuel vapors adapted to vent said means for adsorbing fuel vapors to the atmosphere, said vent conduit including one-way valve means for preventing reverse flow from the atmosphere to said means for adsorbing fuel vapors;
   a pump means in said vent conduit below said one-way valve means for creating a vacuum in said first vapor return branch whereby fuel vapors are pulled from said automotive vehicle fuel tank through said means for adsorbing fuel vapors when said normally closed valve means in said vapor return conduit is in the open position; and
   a conduit constituting said second vapor return branch connecting said three-way valve means with the upper portion of said bulk fuel storage tank whereby said bulk fuel tank may be connected through said three-way valve means to said vapor return conduit when a vacuum condition has been created in said bulk fuel storage tank due to the emptying thereof, thereby pulling fuel vapors from said automotive vehicle fuel tank into said bulk fuel storage tank when said normally closed valve means in said vapor return conduit is in the open position.

2. The fuel vapor recovery system of claim 1 wherein the adsorptive material is activated carbon.

3. The fuel vapor recovery system of claim 2 wherein the plenum means is formed as a part of a head-space of the canister of adsorptive material.

4. The fuel vapor recovery system of claim 2 wherein the plenum means is located down-stream of the canister of adsorptive material.

5. The fuel vapor recovery system of claim 2 wherein said pump means is in an operative mode until a predetermined maximum vacuum is created in said first vapor return branch and does not operate again until the vacuum in said first vapor return branch falls to a predetermined minimum level.

6. The fuel vapor recovery system of claim 5 wherein the maximum vacuum is 10 to 20 inches of water and the minimum is 0.5 to 3.5 inches of water.

7. The fuel vapor recovery system of claim 2 wherein said three-way valve means switches from said first vapor recovery branch to said second vapor recovery branch when the vacuum in said bulk fuel storage tank reaches a predetermined maximum and switches from said second vapor recovery branch to said first vapor recovery branch when the vacuum in said bulk fuel storage tank falls to a predetermined minimum level.

8. The fuel vapor recovery system of claim 7 wherein said maximum vacuum is 2 to 20 inches of water and the mimimum vacuum is 0.5 to 3.5 inches of water.

* * * * *